(12) United States Patent
Hou et al.

(10) Patent No.: US 12,235,570 B2
(45) Date of Patent: Feb. 25, 2025

(54) PROJECTION APPARATUS HAVING SPEAKER

(71) Applicant: Coretronic Corporation, Hsin-Chu (TW)

(72) Inventors: Yi-Cheng Hou, Hsin-Chu (TW); Wei-Min Chien, Hsin-Chu (TW); Tung-Chou Hu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 6 days.

(21) Appl. No.: 17/844,051

(22) Filed: Jun. 20, 2022

(65) Prior Publication Data
US 2022/0413371 A1  Dec. 29, 2022

(30) Foreign Application Priority Data
Jun. 25, 2021 (CN) .......................... 202110709417.5

(51) Int. Cl.
*G03B 21/16* (2006.01)
(52) U.S. Cl.
CPC .................................. *G03B 21/16* (2013.01)
(58) Field of Classification Search
CPC .............................. G03B 21/16; H04N 9/3144
See application file for complete search history.

(56) References Cited

U.S. PATENT DOCUMENTS

| 6,488,378 | B1 * | 12/2002 | Tabuchi | G03B 21/16 |
| | | | | 353/58 |
| 6,558,003 | B2 * | 5/2003 | Mihara | H04N 9/3141 |
| | | | | 349/161 |
| 7,828,445 | B2 * | 11/2010 | Sun | G03B 21/16 |
| | | | | 353/52 |
| 10,616,688 | B2 * | 4/2020 | Kikuchi | H04N 9/3144 |
| 2002/0085178 | A1 * | 7/2002 | Mihara | G03B 21/16 |
| | | | | 348/E5.143 |
| 2005/0019165 | A1 * | 1/2005 | Fujimori | F04D 29/327 |
| | | | | 416/223 R |
| 2009/0103055 | A1 * | 4/2009 | Sun | G03B 21/16 |
| | | | | 353/52 |

(Continued)

FOREIGN PATENT DOCUMENTS

| CN | 106292138 | 1/2017 | |
| CN | 112822607 A * | 5/2021 | ........... H04N 9/3141 |

(Continued)

*Primary Examiner* — Bao-Luan Q Le
(74) *Attorney, Agent, or Firm* — JCIPRNET

(57) ABSTRACT

The disclosure provides a projection apparatus, which includes a casing, a projection module, at least one airflow generating unit, and at least one speaker. The casing has at least one air outlet. The projection module is disposed in the casing and configured to project an image beam outside the casing. The airflow generating unit is disposed in the casing and configured to generate airflow. The speaker is disposed in the casing, and the airflow generating unit is located between the projection module and the speaker. The speaker has at least one flow guiding surface, and the flow guiding surface is inclined toward the air outlet to guide the airflow toward the air outlet. The projection apparatus has a favorable heat dissipation capability and may reduce the noise generated by the airflow generating unit.

16 Claims, 15 Drawing Sheets

(56) References Cited

U.S. PATENT DOCUMENTS

| | | | |
|---|---|---|---|
| 2018/0011392 A1* | 1/2018 | Utsunomiya | G03B 21/16 |
| 2018/0234770 A1* | 8/2018 | Kikuchi | H04N 9/3144 |
| 2020/0186763 A1 | 6/2020 | Chen et al. | |

FOREIGN PATENT DOCUMENTS

| | | | | |
|---|---|---|---|---|
| CN | 112929787 A | * | 6/2021 | H04N 9/3141 |
| CN | 214315590 U | * | 9/2021 | H04N 9/3141 |

* cited by examiner

PROJECTION APPARATUS HAVING SPEAKER

CROSS-REFERENCE TO RELATED APPLICATION

This application claims the priority benefit of Chinese application serial no. 202110709417.5, filed on Jun. 25, 2021. The entirety of the above-mentioned patent application is hereby incorporated by reference herein and made a part of this specification.

BACKGROUND

Technical Field

The disclosure relates to a projection apparatus, and particularly relates to a projection apparatus with a speaker.

Description of Related Art

Projectors are increasingly used in a wide variety of applications, such as theater, home and various advertising purposes. To be used in a variety of scenarios or in combination with other products, many projectors are designed to be different from the usual flat projectors and can be rectangular or cylindrical in shape. When these special-shaped projectors are combined with other products, there may be speakers or components such as batteries near the optical engine, which may cause the airflow generated by the fan thereof to flow poorly or even produce too much backflow, and reduce the heat dissipation capability of the projector. If the projector were to be equipped with an extra airflow guiding structure in order to improve this problem, the manufacturing cost would increase and the overall size of the projector would increase as a result. In addition, the noise generated by the fan is also a problem for the projector in question.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection apparatus having a favorable heat dissipation capability and may reduce noise generated by an airflow generating unit.

The projection apparatus of the disclosure includes a casing, a projection module, at least one airflow generating unit, and at least one speaker. The casing has at least one air outlet. The projection module is disposed in the casing and configured to project an image beam outside the casing. The airflow generating unit is disposed in the casing and configured to generate airflow. The speaker is disposed in the casing, and the airflow generating unit is located between the projection module and the speaker. The speaker has at least one flow guiding surface, and the flow guiding surface is inclined toward the air outlet to guide the airflow toward the air outlet.

Based on the above, in the projection apparatus of the disclosure, the speaker is made to form a flow guiding surface inclined toward the air outlet, so that the airflow generated by the airflow generating unit may be guided by the flow guiding surface and reach the outside of the casing smoothly through the air outlet. In this way, the airflow will not flow poorly or even produce too much backflow due to setting of the speaker, so that the projection apparatus may have a favorable heat dissipation capability. In addition, since the projection apparatus of the disclosure uses existing speaker to provide the flow guiding surface, no additional airflow guiding structure is required, and manufacturing costs may be saved and a size of the projection apparatus may be avoided to be too large. Moreover, in the disclosure, the airflow generating unit is disposed between the projection module and the speaker, and the airflow generated by the airflow generating unit passes through the speaker first and then to the outside of the casing, so that wind noise of the airflow is dispersed by a diaphragm inside the speaker bouncing in multiple directions to achieve an effect of reducing noise of the airflow.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" Component is directly "adjacent to" "B" component or one or more additional components are between "A" component and "B" component. Accordingly, the drawings and descriptions will be regarded as illustrative in nature and not as restrictive.

Figure 1:
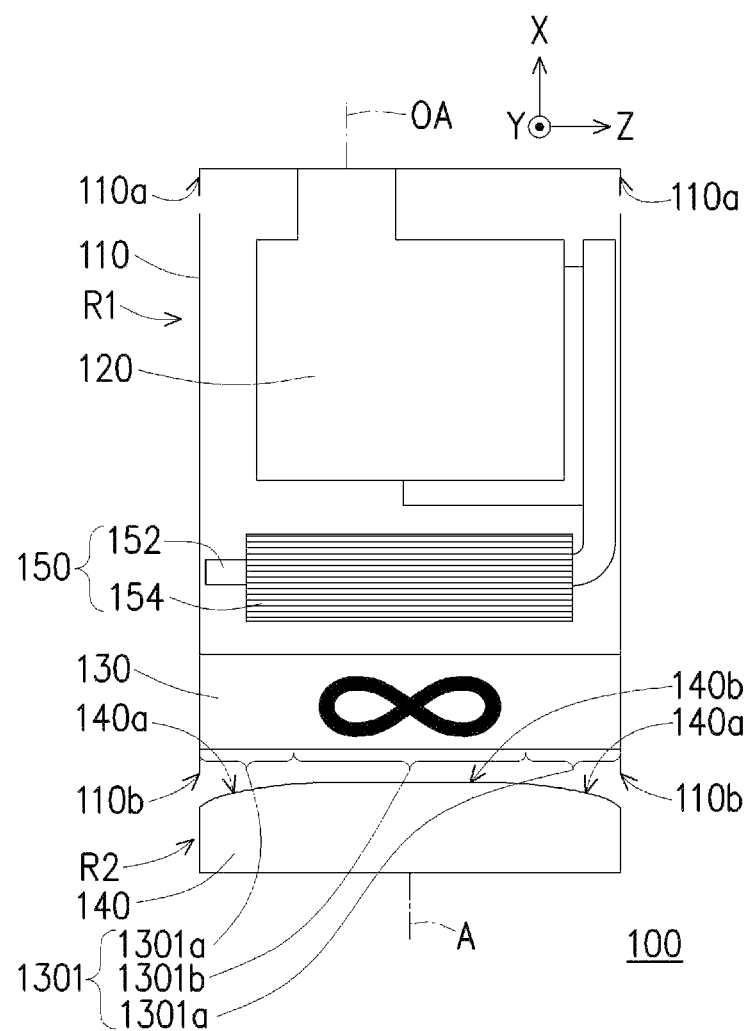
FIG. 1 is a partial structural side view of a projection apparatus according to an embodiment of the disclosure.

FIG. 1 is a partial structural side view of a projection apparatus according to an embodiment of the disclosure. Referring to FIG. 1, a projection apparatus 100 according to this embodiment includes a casing 110, a projection module 120, an airflow generating unit 130, and a heat dissipation module 150. The casing 110 has an air inlet 110a and an air outlet 110b. Numbers of the air inlet 110a and the air outlet 110b are, for example, multiple. The air inlets 110a and the air outlets 110b are distributed around an axial direction A of the casing 110 (shown in FIG. 1) and surround an inner space of the casing 110. The axial direction A of the casing 110 is parallel to an optical axis OA of a projection lens 126 (shown in FIG. 2). The casing 110 is, for example, a cylinder structure.

Figure 2:
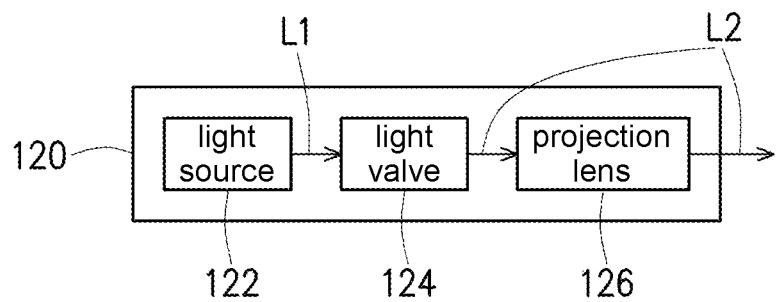
FIG. 2 is a schematic view of a projection module of FIG. 1.

FIG. 2 is a schematic view of a projection module of FIG. 1. The projection module 120 is disposed in the casing 110 and includes a light source 122, a light valve 124, and a projection lens 126 as shown in FIG. 2. The light source 122 is configured to generate an illumination beam L1, the light valve 124 is configured to convert the illumination beam L1 into an image beam L2, and the projection lens 126 is configured to project the image beam L2 outside the casing 110. The light source 122 may be, for example, a lamp, a light emitting diode, and a laser diode (LD). The light valve 124 is, for example, a reflective spatial light modulator, such as reflective liquid crystal on silicon (LCOS) or digital micro-mirror device (DMD). The light valve 124 is, for example, a transmissive spatial light modulator, such as transparent liquid crystal panel. The projection lens 126 is disposed on a transmission path of the image beam L2, and is configured to project the image beam L2 onto a screen or a wall (not shown). For example, a projection lens 126 includes, for example, a combination of one or more optical lenses with refractive power, including, for example, a non-planar lens such as a biconcave lens, a biconvex lens, a concave-convex lens, a convex-concave lens, a plano-convex lens, a plano-concave lens, etc., or various combinations thereof. The disclosure does not limit the type and variety of the projection lens 126. In addition, the heat dissipation module 150 of FIG. 1 includes a heat pipe 152 and a heat dissipation fin set 154. The heat pipe 152 is connected between the light source 122 (referring to FIG. 1 and FIG. 2) and the heat dissipation fin set 154 of the projection module 120. Heat generated by the light source 122 is transferred to the heat dissipation fin set 154 through the heat pipe 152.

Figure 3:
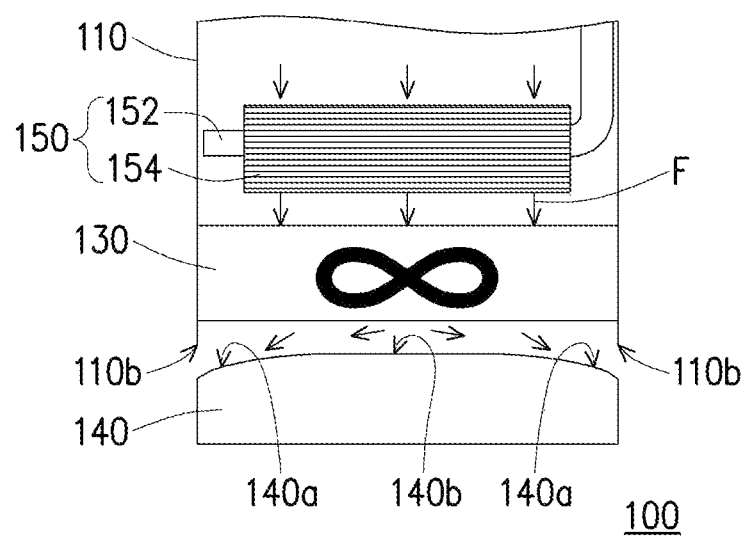
FIG. 3 is a schematic view of airflow paths generated by an airflow generating unit of FIG. 1.

FIG. 3 is a schematic view of airflow paths generated by an airflow generating unit of FIG. 1. The airflow generating unit 130 is, for example, an axial fan disposed in the casing 110 and configured to generate an airflow F for dissipating the projection module 120 and the heat dissipation fin set 154. As shown in FIG. 1 and FIG. 3, the projection apparatus 100 further includes a speaker 140 disposed in the casing 110, and the speaker 140 is, for example, a speaker of a loudspeaker of the projection apparatus 100. The airflow generating unit 130 divides the projection apparatus 100 into a first region R1 and a second region R2. The projection module 120 and the air inlet 110a are located in the first region R1, the speaker 140 and the air outlet 110b are located in the second region R2, the airflow generating unit 130 is located between the projection module 120 and the speaker 140, the airflow generating unit 130 is located between the heat dissipation fin set 154 and the speaker 140, and the air outlet 110b is located between the airflow generating unit 130 and the speaker 140. The speaker 140 has an flow guiding surface 140a, and the flow guiding surface 140a is inclined toward the air outlet 110b of the casing 110 to guide the airflow F toward the air outlet 110b. To further illustrate, an angle exists between an extension surface of the flow guiding surface 140a and a bottom surface of the projection apparatus 100. According to other embodiments, the casing 110 may be an L-shaped structure, for example, the first region R1 is perpendicular to the second region R2, that is, the optical axis OA of the projection lens 126 is perpendicular to a direction in which the airflow F is generated by the airflow generating unit 130, but the disclosure is not limited thereto.

The speaker 140 of the projection apparatus 100 is formed with a flow guiding surface 140a inclined toward the air outlet 110b, so that the airflow F generated by the airflow generating unit 130 may be guided by the flow guiding surface 140a to smoothly pass through the air outlet 110b to outside of the casing 110. In this way, the airflow F will not flow poorly or even produce too much backflow due to setting of the speaker 140, so that the projection apparatus 100 of the disclosure may have a favorable heat dissipation capability. In addition, since the speaker 140 of the projection apparatus 100 provides the flow guiding surface 140a, no additional airflow guiding structure is required, and manufacturing costs may be saved and a size of the projection apparatus 100 may be avoided to be too large.

Specifically, according to this embodiment, as shown in FIG. 1, a thickness of the speaker 140 gradually decreases toward a direction close to the air outlet 110b to form the flow guiding surface 140a. The air guiding surface 140a is inclined toward the air outlet 110b with respect to a direction perpendicular to the optical axis OA of the projection lens 126 (X direction as shown in FIG. 1). In addition, a surface 1301 (shown in FIG. 1) of the airflow generating unit 130 according to this embodiment faces the speaker 140 and includes an air outlet region 1301a and a non-air outlet region 1301b. The air outlet region 1301a surrounds the non-air outlet region 1301b. To further illustrate, the non-air outlet region 1301b is, for example, a position of a fan shaft. A flat surface 140b of the speaker 140 corresponds to the non-air-outlet region 1301b, and the flow guiding surface 140a surrounds the flat surface 140b. An orthographic projection of the flow guiding surface 140a on the surface 1301 of the airflow generating unit 130 covers the air outlet region 1301a, so that the airflow F from the air outlet region 1301a of the airflow generating unit 130 may be smoothly guided toward the air outlet 110b by the flow guiding surface 140a.

Figure 4:
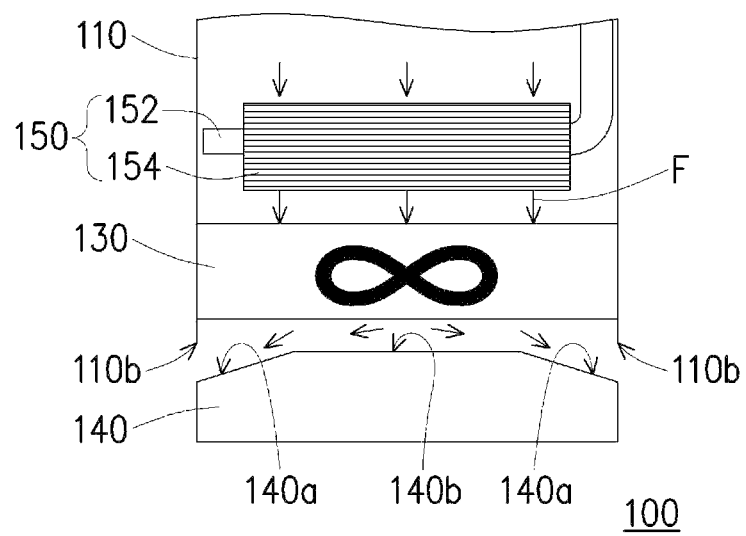
FIG. 4 and FIG. 5 illustrate that a flow guiding surface of FIG. 3 is changed to different shapes.
Figure 5:
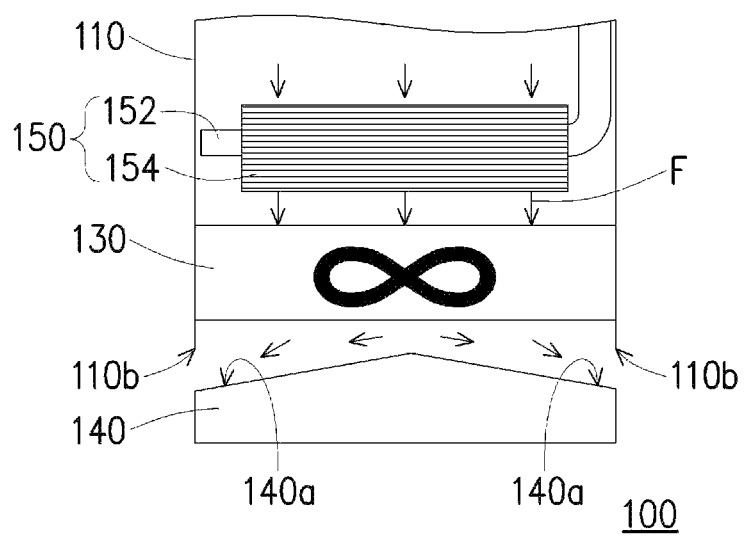

FIG. 4 and FIG. 5 illustrate that a flow guiding surface of FIG. 3 is changed to different shapes. The disclosure does not limit the shape of the flow guiding surface of the speaker, which may be in addition to the flow guiding surface 140a shown in FIG. 3 as a curved surface, may also be the flow guiding surface 140a shown in FIG. 4 as an inclined surface. Moreover, the speaker 140 may not have a flat surface 140b as shown in FIG. 5, so that a coverage area of the flow guiding surface 140a is larger.

Figure 6:
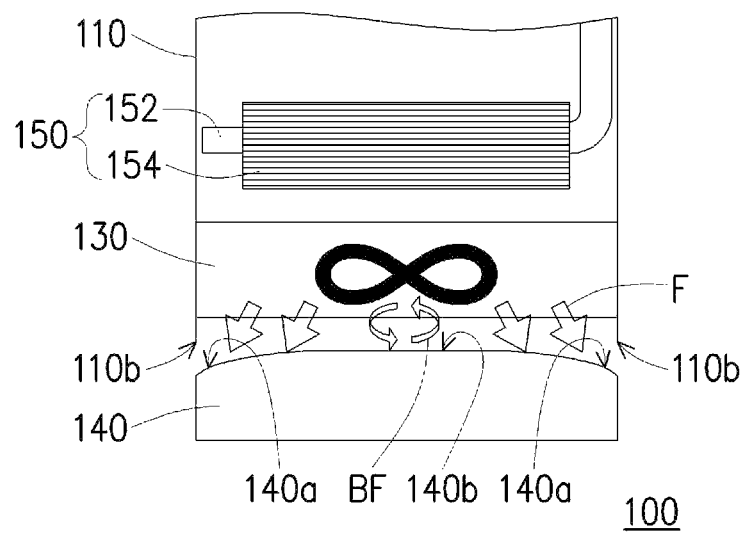
FIG. 6 and FIG. 7 respectively illustrate that speakers of FIG. 3 and FIG. 5 reduce backflow through flow guiding surfaces thereof.
Figure 7:
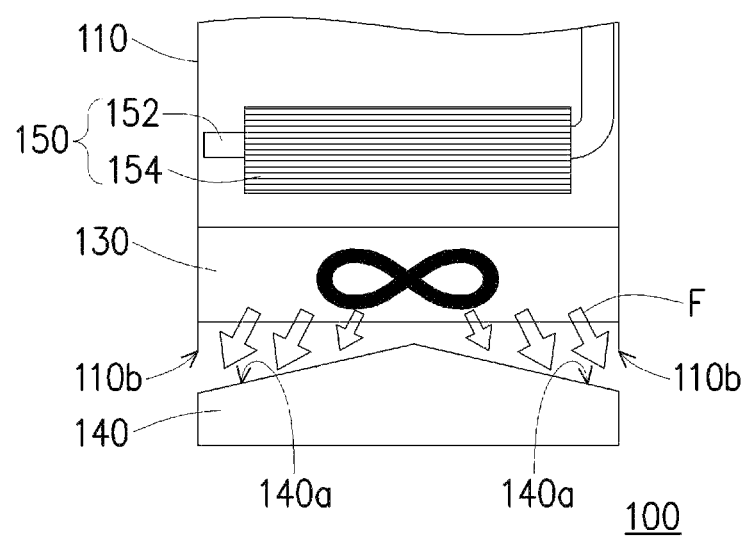

FIG. 6 and FIG. 7 respectively illustrate that speakers of FIG. 3 and FIG. 5 reduce backflow through flow guiding surfaces thereof. As shown in FIG. 6, by means of the flow guiding surface 140a, the airflow F from the airflow generating unit 130 is well guided, so that the backflow only appears in small amounts above the flat surface 140b. As shown in FIG. 7, by designing the speaker 140 as not having a flat surface 140b and allowing the flow guiding surface 140a to cover a larger area, the airflow F may be more completely guided and almost no backflow is generated.

Figure 8:
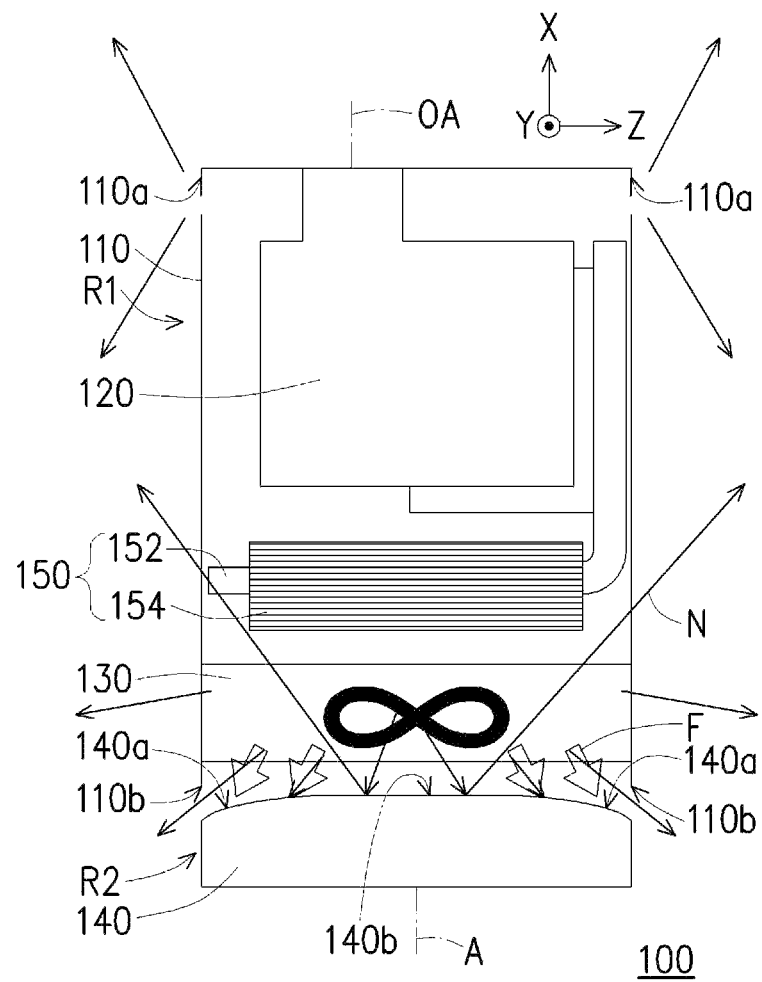
FIG. 8 illustrates that wind noise generated by the airflow generating unit of FIG. 1 is bounced by a speaker.

FIG. 8 illustrates that wind noise generated by the airflow generating unit of FIG. 1 is bounced by a speaker. The airflow generating unit 130 is disposed between the projection module 120 and the speaker 140, so that the airflow F generated by the airflow generating unit 130 passes through the speaker 140 first and then to the outside of the casing 110, which may make a main propagation direction N of the wind noise of the airflow F as shown in FIG. 8 be dispersed by a diaphragm inside the speaker 140 bouncing in multiple directions to achieve an effect of reducing noise of the airflow F. Specifically, compared with a conventional design approach in which the airflow generating unit 130 is not disposed between the projection module 120 and the speaker 140, with the same specification noise (e.g., 26 dB) configuration, the wind noise of the airflow F according to this embodiment causes a more even distribution of noise around the projection apparatus 100, with highest noise located on the speaker 140 side of the casing 110 being, for example, 27 dB, which is lower than 28 dB for those with the conventional design approach, especially in a rear area of the projection apparatus 100 where the noise is reduced.

The disclosure does not limit number of speakers, number of airflow generating units, and relative configuration of internal components of the casing, which are illustrated below with reference to the accompanying drawings.

Figure 9:
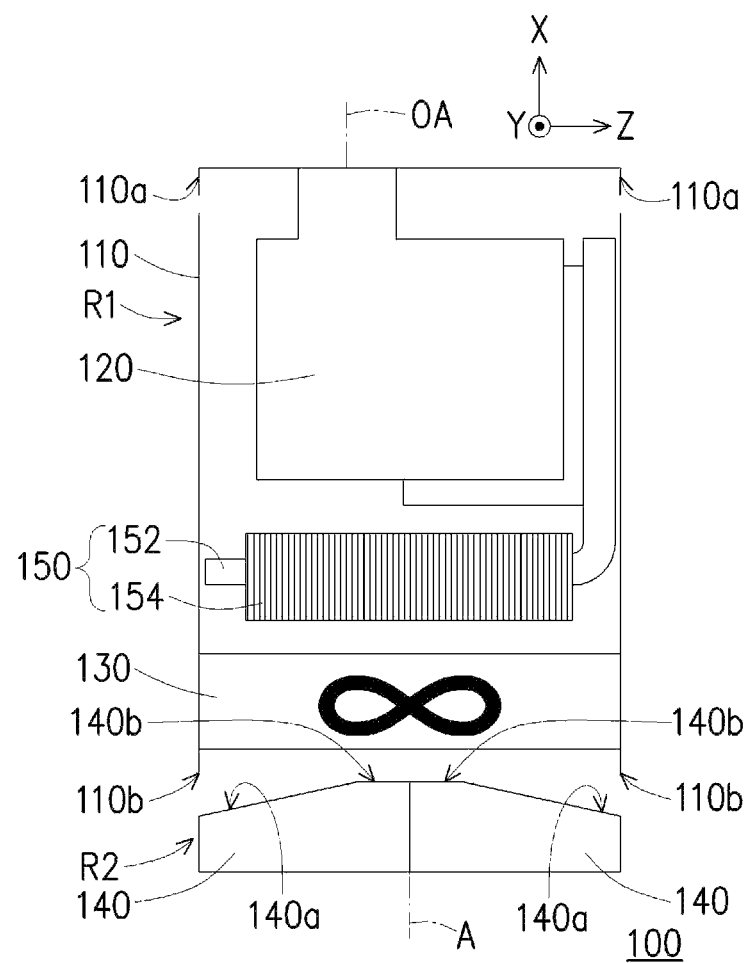
FIG. 9 to FIG. 14 are partial structural side views of projection apparatuses according to other embodiments of the disclosure.
Figure 10:
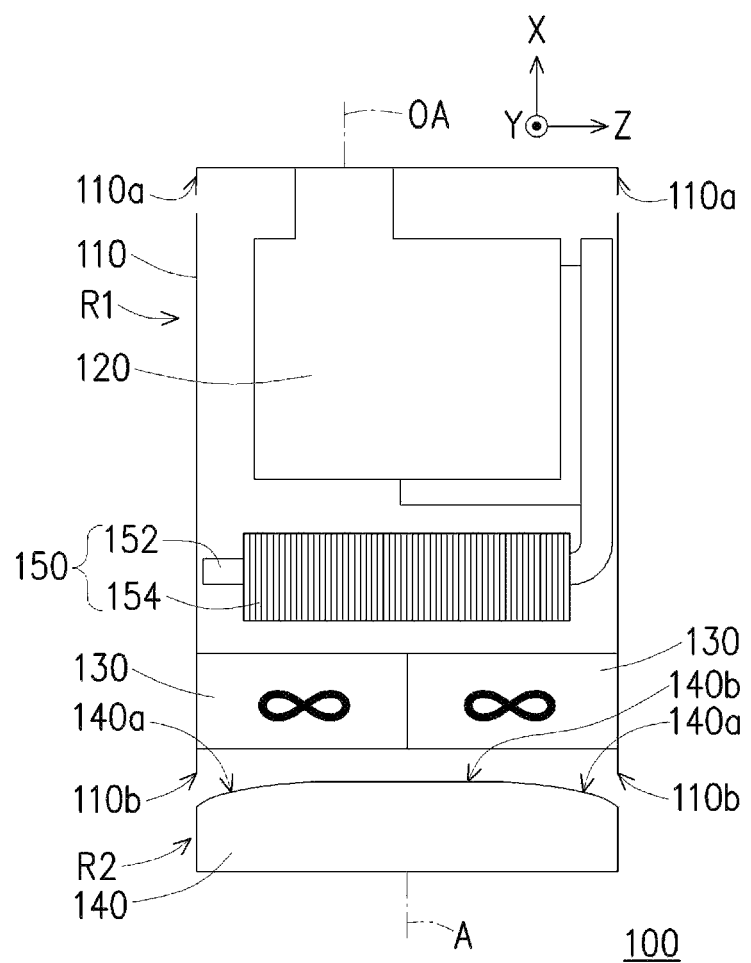
Figure 11:
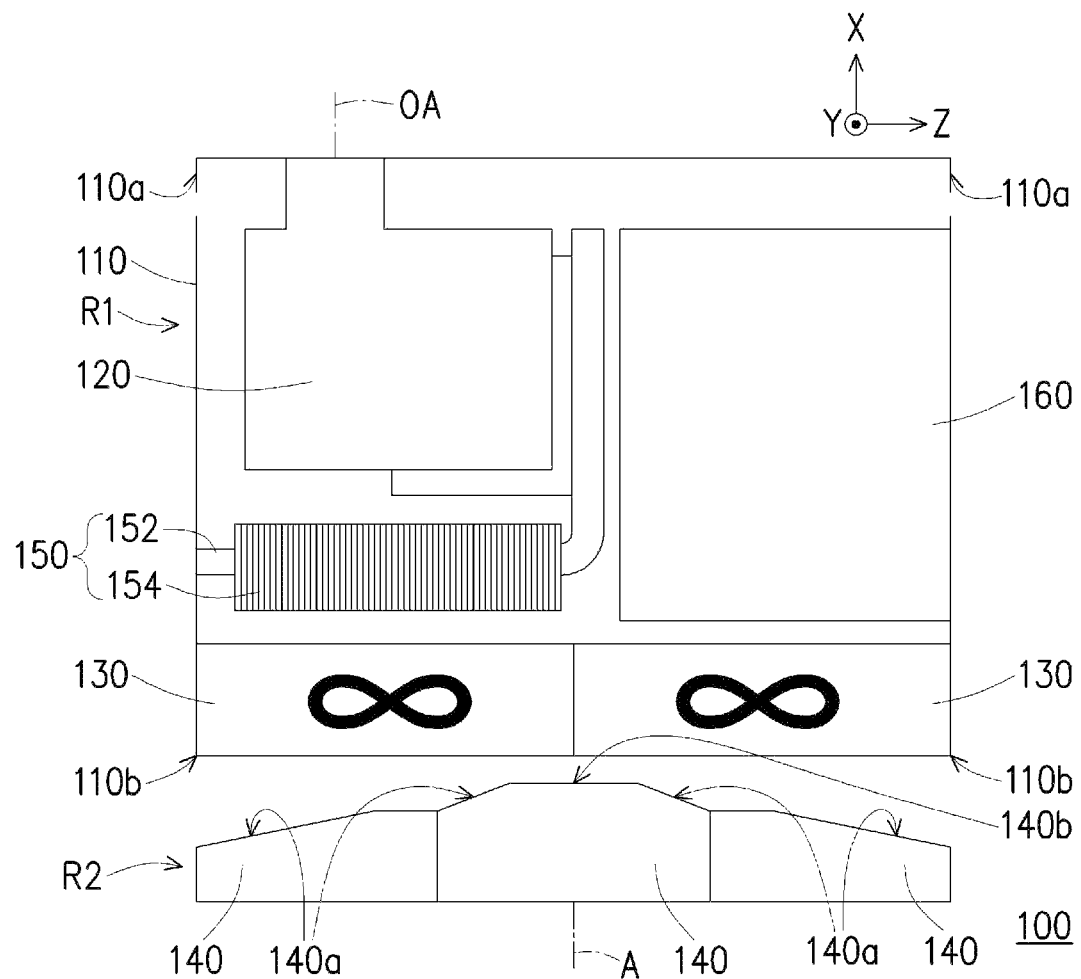
Figure 12:
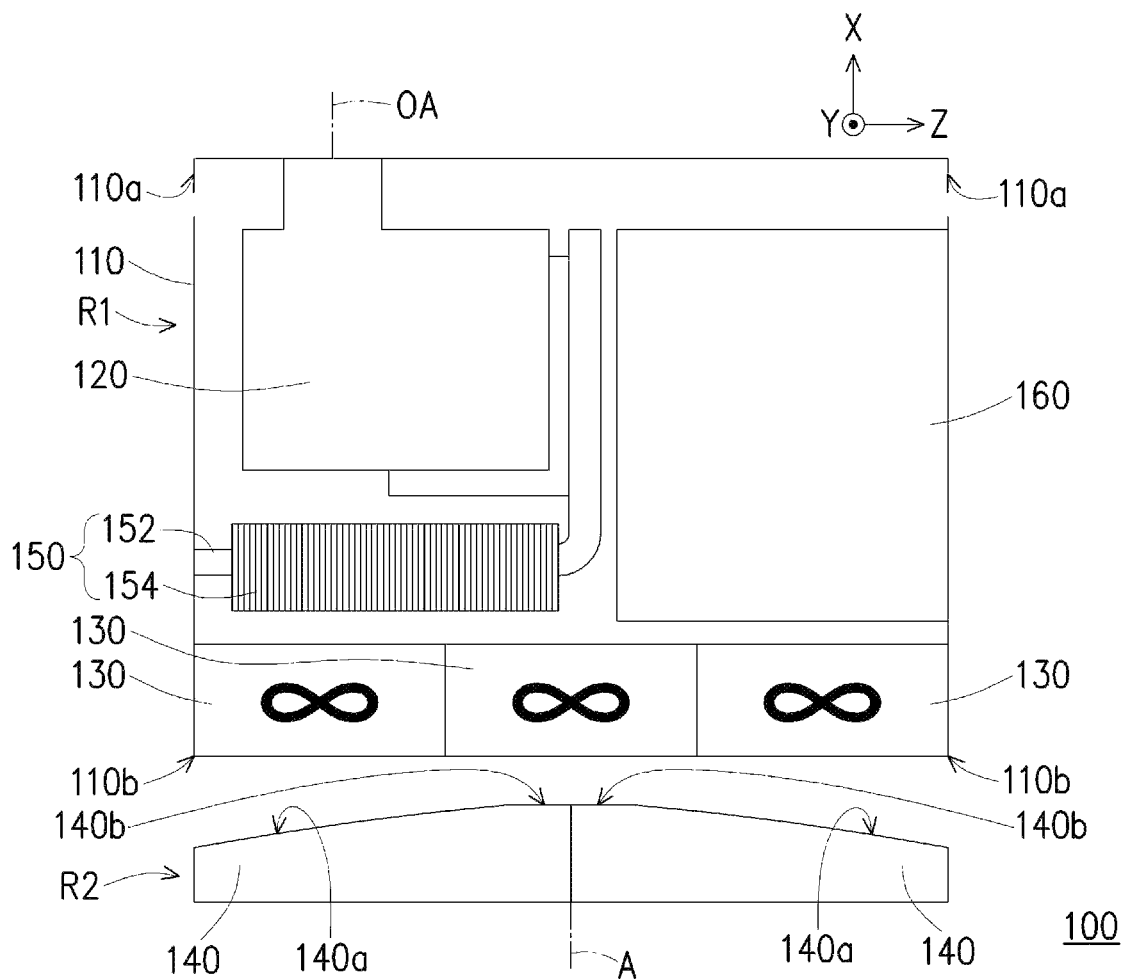
Figure 13:
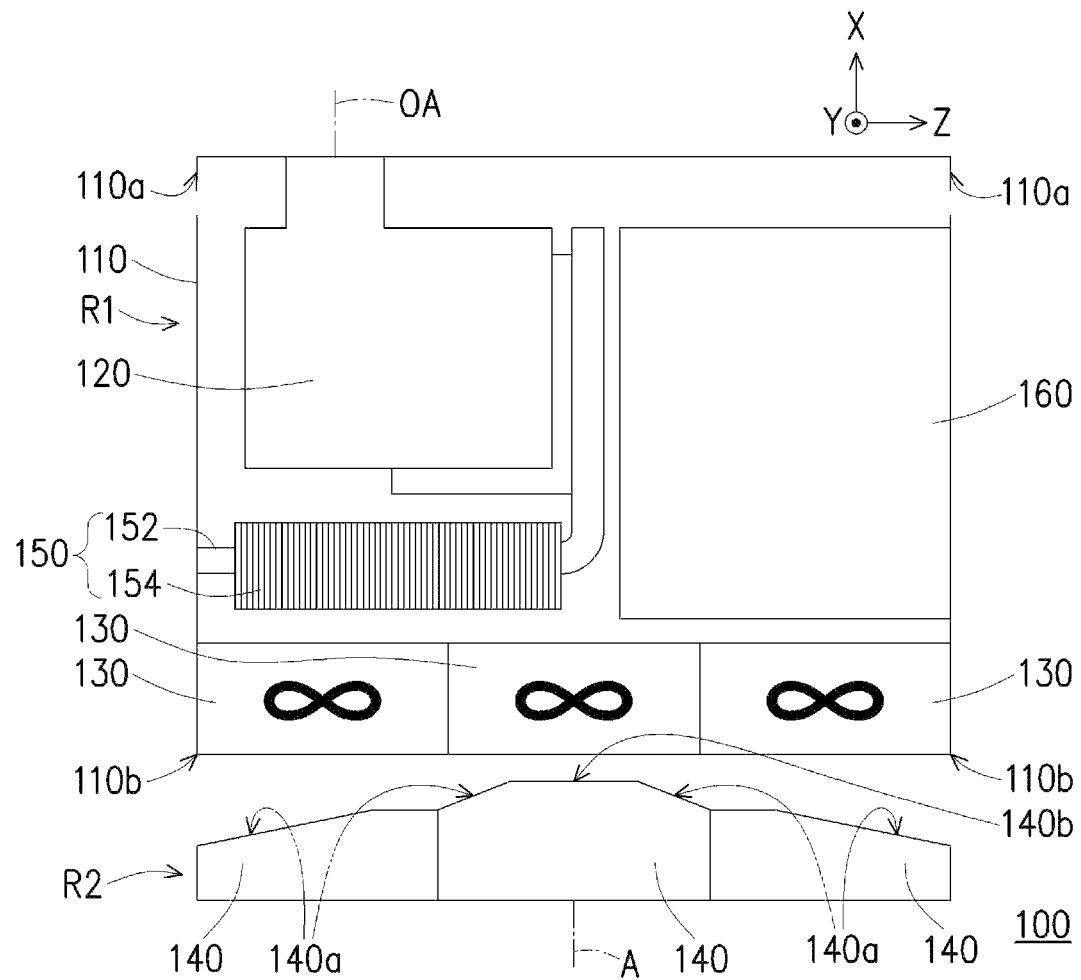
Figure 14:
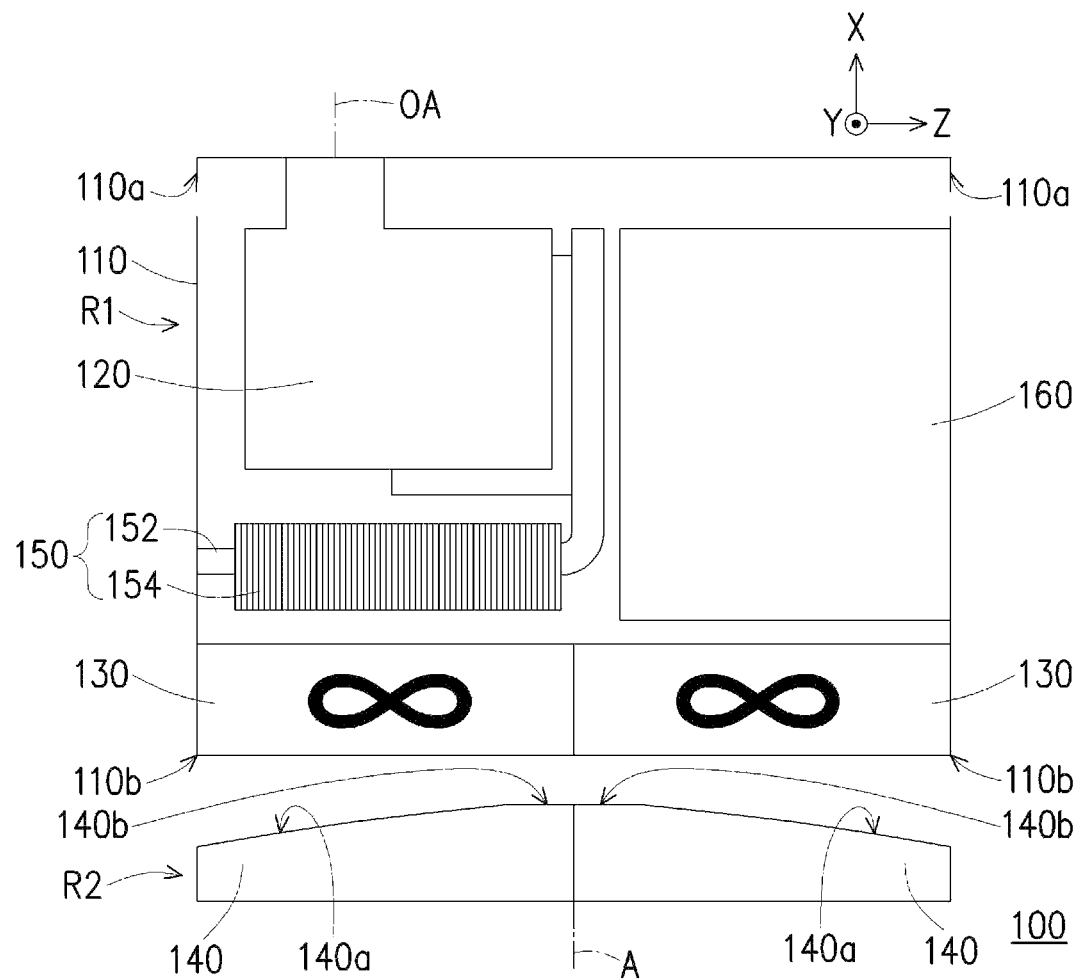

FIG. 9 to FIG. 14 are partial structural side views of projection apparatuses according to other embodiments of the disclosure. The embodiment shown in FIG. 9 differs from the embodiment shown in FIG. 4 in that the number of speakers 140 in FIG. 9 is two, and they are arranged in a Z direction. The embodiment shown in FIG. 10 differs from the embodiment shown in FIG. 1 in that number of the airflow generating unit 130 in FIG. 10 is two, and they are arranged in the Z direction. The main difference between the embodiment shown in FIG. 11 and the embodiment shown in FIG. 10 is that the number of speakers 140 in FIG. 11 is three. Moreover, according to the embodiment shown in FIG. 11, in addition to configuration position of the projection module 110 corresponding to the airflow generating unit 130, configuration position of a circuit module 160 located in the casing 110 also corresponds to the airflow generating unit 130. The airflow generating unit 130 is located between the circuit module 160 and the speaker 140. The circuit module 160 may include at least one of a circuit board assembly, a light source driver, and a power supply. The embodiment shown in FIG. 12 differs from the embodiment shown in FIG. 11 in that the number of speakers 140 in FIG. 12 is two, and the number of the airflow generating units 130 in FIG. 12 is three. The embodiment shown in FIG. 13 differs from the embodiment shown in FIG. 12 in that the number of speakers 140 in FIG. 13 is three. The embodiment shown in FIG. 14 differs from the embodiment shown in FIG. 12 in that the number of the airflow generating units 130 in FIG. 14 is two.

The disclosure does not limit position of the air outlet and shape of the casing, which are illustrated below with reference to the accompanying drawings.

Figure 15:
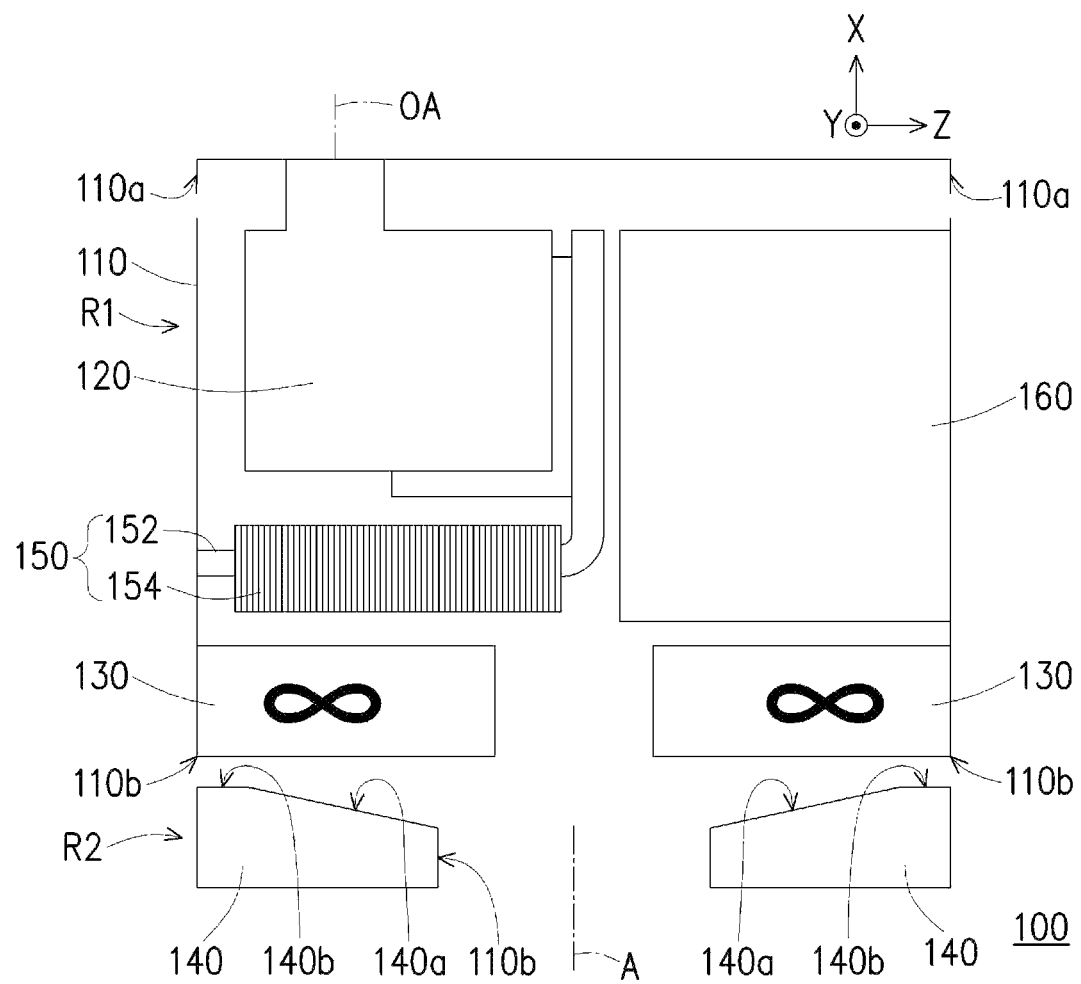
FIG. 15 to FIG. 18 are partial structural side views of projection apparatuses according to other embodiments of the disclosure.
Figure 16:
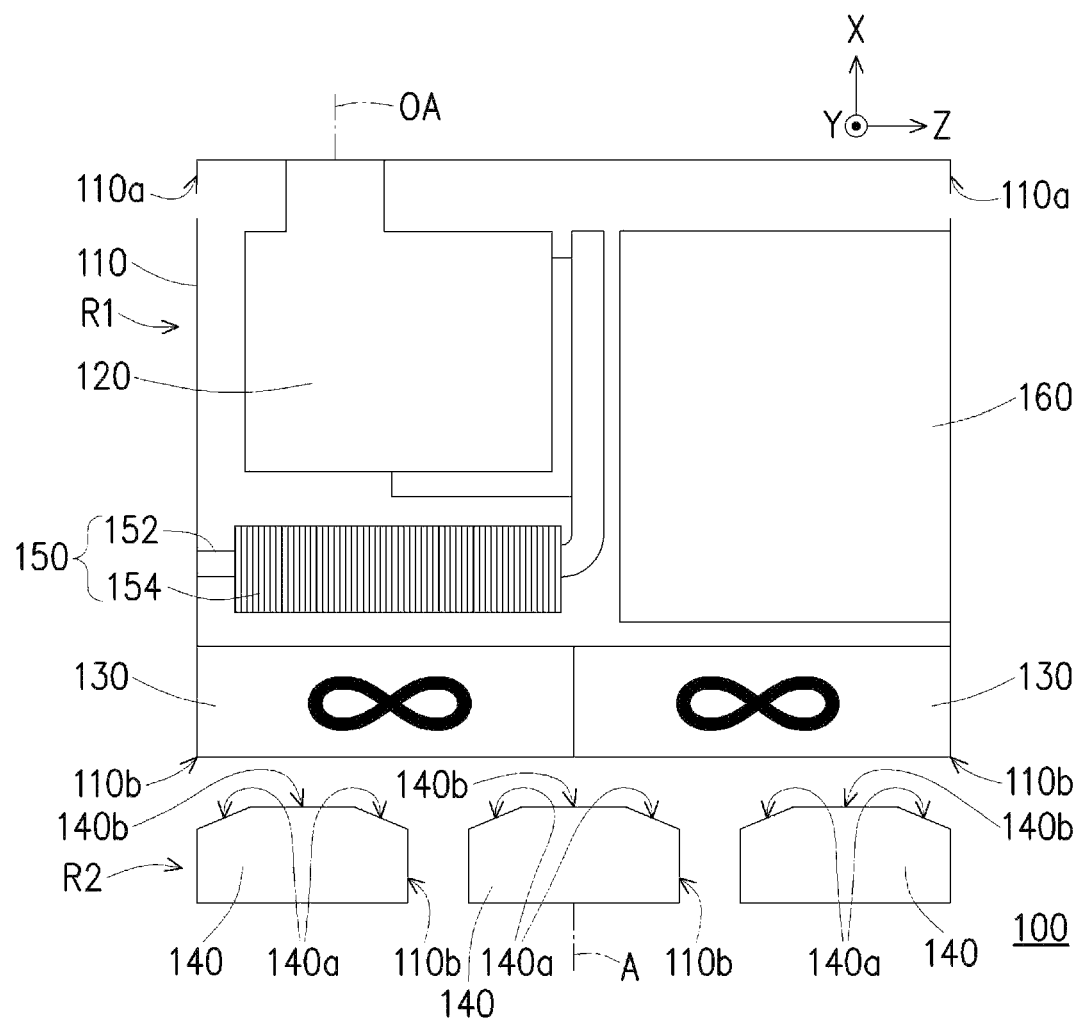
Figure 17:
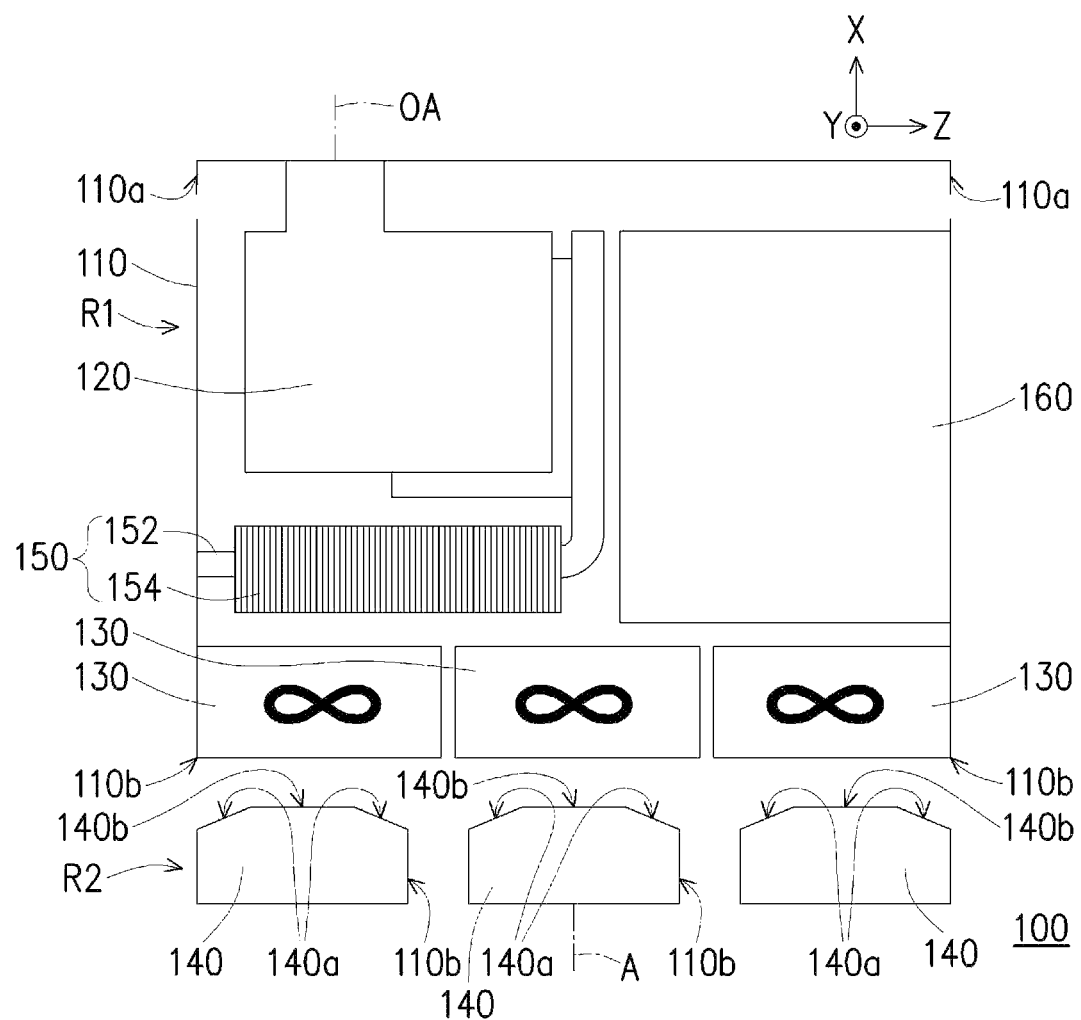
Figure 18:
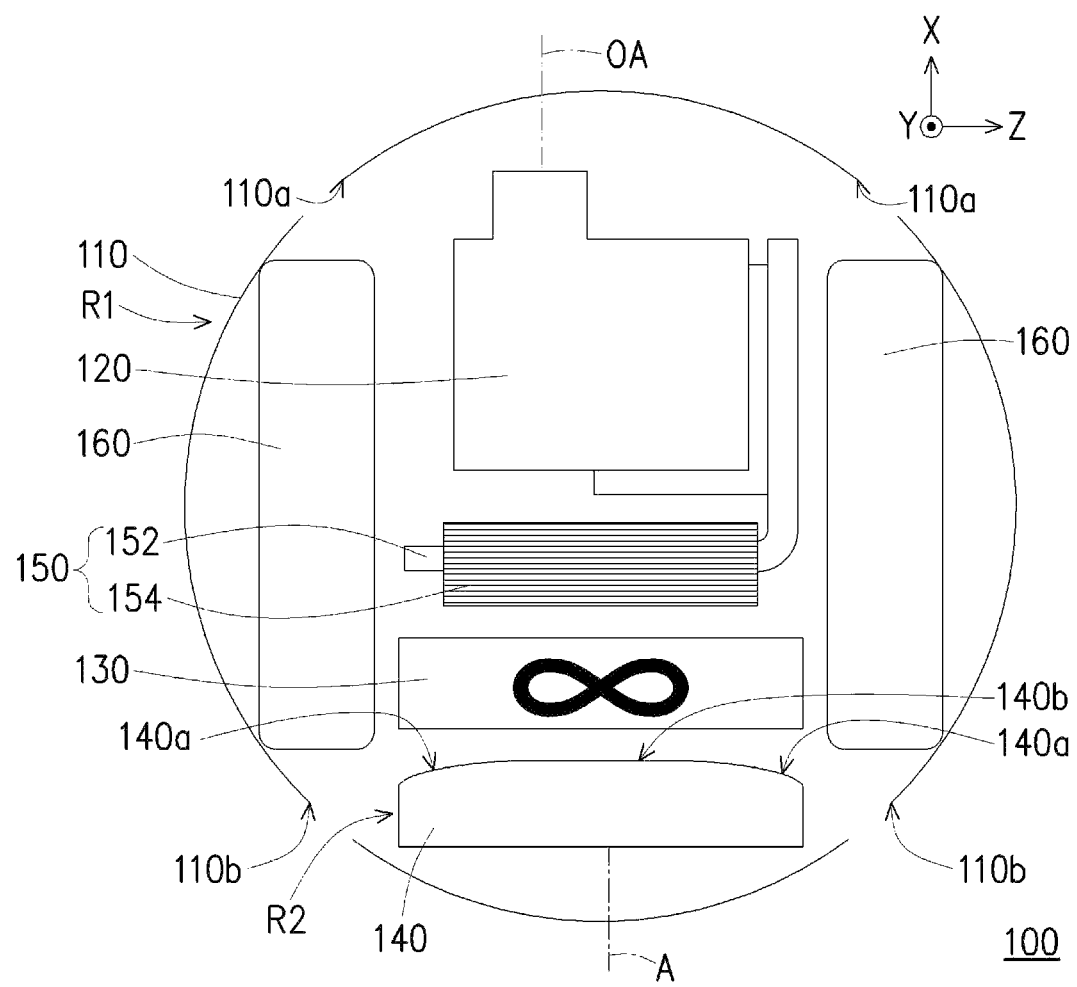

FIG. 15 to FIG. 18 are partial structural side views of projection apparatuses according to other embodiments of the disclosure. The embodiment shown in FIG. 15 differs from the embodiment shown in FIG. 14 in that the two airflow generating units 130 in FIG. 15 are separated from each other, the two speakers 140 are separated from each other, and the air outlet 110b is located between the two speakers 140. The embodiment shown in FIG. 16 differs from the embodiment shown in FIG. 14 in that the number of speakers 140 in FIG. 16 is three and they are separated from each other, and a part of the air outlet 110b is located between adjacent speakers 140. The embodiment shown in FIG. 17 differs from the embodiment shown in FIG. 16 in that the number of airflow generating units 130 in FIG. 17 is three and they are separated from each other. The embodiment shown in FIG. 18 differs from the embodiment shown in FIG. 1 in that the casing 110 of FIG. 18 is spherical, and the circuit module 160 is divided into two parts and located on opposite sides of the casing 110 respectively. According to other embodiments, the casing 110 may be otherwise suitably shaped, which is not limited in the disclosure.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus comprising: a casing, a projection module, at least one airflow generating unit, and at least one speaker, wherein
the casing has a plurality of air outlets, wherein the casing is a cylinder structure, and the plurality of air outlets are disposed around an axial direction of the casing and surround an inner space of the casing;
the projection module is disposed in the inner space of the casing and configured to project an image beam outside the casing;
the at least one airflow generating unit is disposed in the inner space of the casing and configured to generate airflow; and
the at least one speaker is disposed in the inner space of the casing, wherein the at least one airflow generating unit is located between the projection module and the at least one speaker in the axial direction of the casing, the plurality of air outlets are located between the at least one airflow generating unit and the at least one speaker in a direction parallel to the axial direction of the casing, each of the at least one speaker has at least one flow guiding surface, and each of the at least one flow guiding surface is inclined toward the plurality of air outlets to guide the airflow toward the plurality of air outlets.

2. The projection apparatus according to claim 1, wherein the at least one airflow generating unit divides the projection apparatus into a first region and a second region, the projection module is located in the first region, and the at least one speaker and the plurality of air outlets are located in the second region.

3. The projection apparatus according to claim 2, wherein the casing has at least one air inlet, and the at least one air inlet is located in the first region.

4. The projection apparatus according to claim 1, wherein the projection module comprises a light source, a light valve, and a projection lens, wherein the light source is configured to generate an illumination beam, the light valve is configured to convert the illumination beam into the image beam, and the projection lens is configured to project the image beam.

5. The projection apparatus according to claim 4, further comprising a heat dissipation module, wherein the heat dissipation module is connected to the light source, and the at least one airflow generating unit is located between the heat dissipation module and the at least one speaker.

6. The projection apparatus according to claim 5, wherein the heat dissipation module comprises a heat pipe and a heat dissipation fin set, the heat pipe is connected between the light source and the heat dissipation fin set, and the at least one airflow generating unit is located between the heat dissipation fin set and the at least one speaker.

7. The projection apparatus according to claim 4, wherein the at least one flow guiding surface is inclined to the plurality of air outlets with respect to a direction perpendicular to an optical axis of the projection lens.

8. The projection apparatus according to claim 1, wherein a thickness of the at least one speaker gradually decreases toward a direction close to the plurality of air outlets to form the at least one flow guiding surface.

9. The projection apparatus according to claim 1, wherein the at least one speaker has a flat surface, the at least one flow guiding surface surrounds the flat surface, and the flat surface corresponds to the non-air outlet region.

10. The projection apparatus according to claim 1, wherein a number of the at least one speaker is plural, and the plurality of speakers are arranged in a direction perpendicular to a direction of outlet air of the at least one airflow generating unit.

11. The projection apparatus according to claim 1, wherein a number of the at least one airflow generating unit is plural, and the plurality of airflow generating units are arranged in a direction perpendicular to a direction of outlet air of each of the airflow generating units.

12. The projection apparatus according to claim 1 comprising a circuit module, wherein the circuit module is disposed in the casing, and the at least one airflow generating unit is located between the circuit module and the at least one speaker.

13. The projection apparatus according to claim 12, wherein the circuit module comprises at least one of a circuit board assembly, a light source driver, and a power supply.

14. The projection apparatus according to claim 1, wherein the at least one airflow generating unit comprises a fan.

15. The projection apparatus according to claim 1, wherein the at least one flow guiding surface comprises at least one of an inclined surface and a curved surface.

16. The projection apparatus according to claim 1, wherein each of the at least one airflow generating unit has a surface, the surface of each of the at least one airflow generating unit comprises an air outlet region and a non-air outlet region, the air outlet region surrounds the non-air outlet region, each of the at least one flow guiding surface faces the air outlet region of the surface of corresponding one of the at least one airflow generating unit, and an orthographic projection of each of the at least one flow guiding surface on the surface of the corresponding one of the at least one airflow generating unit covers the air outlet region of the surface of the corresponding one of the at least one airflow generating unit.

* * * * *